United States Patent [19]

Takahashi

[11] Patent Number: 5,089,963
[45] Date of Patent: Feb. 18, 1992

[54] SHIFTING CONTROL FOR AUTOMATIC POWER TRANSMISSION WITH LEARNING SHIFTING PATTERN MODEL AND SELECTING SHIFTING PATTERN MODEL FROM CLOSED VEHICULAR DRIVING PATTERN

[75] Inventor: Hiroshi Takahashi, Kanagawa, Japan

[73] Assignee: Nissan Motor Company, Limited, Yokohama, Japan

[21] Appl. No.: 375,970

[22] Filed: Jul. 6, 1989

[30] Foreign Application Priority Data

Jul. 6, 1988 [JP] Japan .................................. 63-169236

[51] Int. Cl.⁵ ...................... B60K 41/06; G06F 15/18
[52] U.S. Cl. .................................. 364/424.1; 74/866; 395/1
[58] Field of Search ................. 364/424.1, 513; 74/866

[56] References Cited

U.S. PATENT DOCUMENTS

| 4,730,259 | 3/1988 | Gallant | 364/513 |
| 4,774,677 | 9/1988 | Buckley | 364/513 |
| 4,777,585 | 10/1988 | Kokawa et al. | 364/513 |
| 4,809,175 | 2/1989 | Hosaka et al. | 364/424.1 |
| 4,841,815 | 6/1989 | Takahashi | 364/424.1 |
| 4,914,708 | 4/1990 | Carpenter et al. | 364/513 |
| 4,979,126 | 12/1990 | Pao et al. | 364/513 |

Primary Examiner—Salvatore Cangialosi
Attorney, Agent, or Firm—Foley & Lardner

[57] ABSTRACT

A transmission gear shifting control system is selective of gear ratio of an automotive automatic power transmission. The control system employs a strategy of learning of driving condition in order to select one of a plurality of vehicle driving pattern so as to adapt to the vehicular driving condition and the driver's desire, by means of neuron computer. The system monitors a plurality of vehicle driving parameters and storing driving pattern data in an associative storage for forming stored driving pattern. The driving pattern data is stored in terms of relevant one of transmission gear shifting patterns so that the transmission gear shifting pattern can be selected in response to entry of the stored relevant driving pattern. The control system is further operable for associatively recollecting one of driving pattern on the basis of the monitored driving parameters and stored driving patterns.

10 Claims, 9 Drawing Sheets

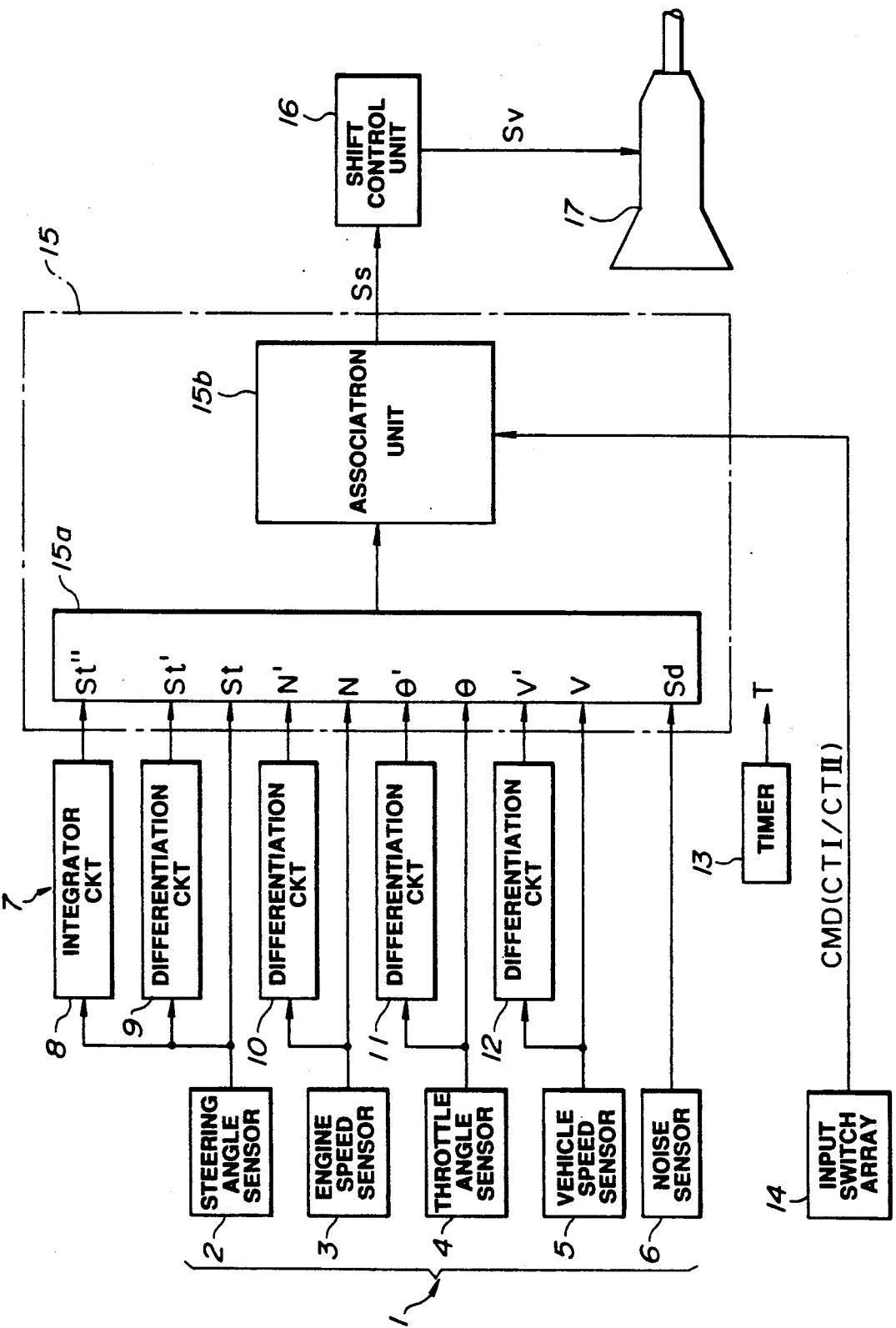

SHIFTING CONTROL FOR AUTOMATIC POWER TRANSMISSION WITH LEARNING SHIFTING PATTERN MODEL AND SELECTING SHIFTING PATTERN MODEL FROM CLOSED VEHICULAR DRIVING PATTERN

BACKGROUND OF THE INVENTION

1. Field of the Invention

The present invention relates generally to a control system for an automotive automatic power transmission which can adapt shifting timing of the transmission to a driver's feeling. More specifically, the invention relates to an intelligent control system for an automatic power transmission which adapts a transmission shifting pattern to a vehicle driving pattern for a specific driver.

2. Description of the Background Art

In modern automatic power transmission control systems, electronic control units have been employed for precisely and optimally controlling shifting of the automatic power transmissions. Some modernized transmission control systems employ variable shift pattern strategy for adapting transmission shift patterns to individual vehicle driving patterns which are generally determined based on vehicle speed and throttle valve angular positions. For example, Japanese Patent First (unexamined) Publications (Tokkai) Showa 59-200845 and Showa 59-200848 discloses transmission control systems which employ shifting tables containing a plurality of transmission gear ratio shifting patterns.

Tokkai Showa 59-200845 discloses a transmission control system which has two transmission gear shifting pattern maps. One map is directed to a general shift pattern to be used in usual traffic. The other map is directed to a special shift pattern for extraordinarily heavy traffic. The proposed system utilizes a throttle pedal depression pattern as a parameter for selecting one of two transmission shifting pattern maps. On the other hand, Tokkai Showa 59-200848 discloses a similar transmission control system for selectively using transmission shifting pattern maps. In the proposed system, longitudinal acceleration is used as a parameter for selecting one of the maps.

In either case, the prior proposed transmission control systems employ a singular parameter for selecting shifting pattern maps. In this type of transmission control system, the selected parameter is compared with a predetermined criterion for selecting one of the preset transmission shift patterns. A drawback of this system is that the singular parameter does not always represent the actual driving condition. Therefore, a failure to detect the actual driving condition may cause erroneous selection of an inappropriate shifting pattern which will degrade the drivability of the vehicle.

SUMMARY OF THE INVENTION

Therefore, it is an object of the present invention to provide a transmission shift control system which can optimize the transmission shifting pattern for all driving patterns.

Another object of the invention is to provide a transmission shift control system which introduces strategy of learning of the driving pattern of a driver and corresponding shift pattern and utilizing the learned shift pattern for optimization of the transmission shifting pattern characteristics.

In order to accomplish aforementioned and other objects, a transmission shifting control system, according to the present invention, is selective of gear ratio of an automotive automatic power transmission. The control system employs a strategy of learning of driving condition in order to select one of a plurality of vehicle driving pattern so as to adapt to the vehicular driving condition and the driver's desire, by means of neuron computer. The system monitors a plurality of vehicle driving parameters and storing driving pattern data in an associative storage for forming stored driving pattern. The driving pattern data is stored in terms of relevant one of transmission gear shifting patterns so that the transmission gear shifting pattern can be selected in response to entry of the stored relevant driving pattern. The control system is further operable for associatively recollecting one of driving pattern on the basis of the monitored driving parameters and stored driving patterns.

According to one aspect of the invention, a control system for controlling transmission gear shifting for an automative power transmission of an automotive vehicle comprises:

first means, associated with the automatic transmission for causing variation of transmission gear ratio at a desired gear ratio;

second means for manually commanding by entering mode selector command for selecting one of a plurality of transmission gear shifting patterns;

second means for monitoring a plurality of vehicle driving parameters for producing parameter data representative of respective of monitored parameter;

third means for receiving the parameter data and forming a driving pattern data representative of current vehicle driving condition, the driving pattern data containing individual parameter indicative data components corresponding to respective of transmission gear shifting control parameter, and coupling data components respectively representative of relationship between individual parameter indicative data components;

fourth means for storing the driving pattern data, the fourth means updating the driving pattern corresponding to selected one of the transmission gear shifting patterns in response to the mode selector command;

fifth means for receiving the parameter data and associatively recollecting one of stored driving pattern data so as to select one of the transmission gear shifting pattern corresponding to the recollected driving pattern; and sixth means for selecting transmission gear ratio on the basis of the parameter data from the second means and according to selected one of the transmission gear shifting patterns, so to as operate the first means for setting the transmission at the drived gear ratio.

According to another aspect of the invention, a neuron computer based control system for controlling tranmission gear shifting for an automative power transmission of an automotive vehicle comprises:

first means, associated with the automatic transmission for causing variation of transmission gear ratio at a desired gear ratio;

second means for manually commanding by entering mode selector command for selecting one of a plurality of transmission gear shifting patterns;

second means for monitoring a plurality of vehicle driving parameters for producing parameter data representative of respective of monitored parameter;

third means, having neuron elements forming storage matrix and synapse elements for intercoupling between pairs of neuron elements, for receiving the parameter data and forming a driving pattern data representative of current vehicle driving condition, the driving pattern data containing individual parameter indicative data components corresponding to respective of transmission gear shifting control parameter, which individual parameter indicative data components are stored in the neuron elements, and coupling data components representative of strength of the synapse elements intercoupling pairs of neuron elements;

fourth means for storing the driving pattern data, the fourth means updating the driving pattern corresponding to selected one of the transmission gear shifting patterns in response to the mode selector command;

fifth means for receiving the parameter data and associatively recollecting one of stored driving pattern data so as to select one of the transmission gear shifting pattern corresponding to the recollected driving pattern; and sixth means for selecting transmission gear ratio on the basis of the parameter data from the second means and according to selected one of the transmission gear shifting patterns, so to as operate the first means for setting the transmission at the derived gear ratio.

Preferably, the control system further comprises a seventh means for selectively enabling and disabling the fifth means. The seventh means counts up occurrence of updating of the driving pattern data in the fourth means and enables the fifth means when the counted updation occurrence is in excess of a predetermined criterion.

The neuron elements may comprise memory cells for storing the individual parameter indicative data components and variable of stored data between mutually distinct first and second values, the matrix containing a plurality of first matrix lines respectively provided for respective of the individual parameter indicative data components and a plurality of second matrix lines respectively provided for representing range of values of respective individual parameter indicative data components. The fourth means may further include a storage for storing the coupling data components which is variable in values depending upon relationship between respective relevant pairs of individual parameter indicative data components. The fourth means may increase value of the coupling data component when the relevant pair of individual parameters indicative data components in the matrix have equal values and decreases otherwise.

The second means may monitor at least two of steering angular position, a throttle valve angular position, a vehicle speed and an engine revolution speed for producing the parameter data representative thereof. Also, the second means may additionally monitor a noise level in a vehicular cabin for producing parameter data indicative thereof.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for the purpose of explanation and understanding only.

In the drawings:

FIGS. 2 through 6 are explanatory illustrations provided for discussing the logic of "ASSOCIATRON" which is employed for associatively selecting one of the stored models of transmission gear ratio shifting patterns, in which FIG. 2 shows a diagrammatical illustration of the basic structure of "ASSOCIATRON";

FIG. 3 shows an equivalent circuit of the basic structure of "ASSOCIATRON" of FIG. 2;

FIG. 4 shows a matrix of "neurons" in an associative storage employed in "ASSOCIATRON";

FIG. 6 shows the matrix of "neurons" for which inputs are provided, which are used as parameter for recollection of data stored in the associative memory utilizing the logic of "ASSOCIATRON";

FIG. 7 is a block diagram of the preferred embodiment of the automatic power transmission gear shifting control system according to the present invention;

DETAILED DESCRIPTION OF THE INVENTION AND PREFERRED EMBODIMENT OF THE INVENTION

In advance of discussing about the preferred embodiment of the invention, the fundamental idea of an automatic power transmission gear shifting control system, according to the present invention, will be discussed in detailed in order to facilitate a clear understanding of the invention. The general discussion of the automatic power transmission gear shifting control system according to the invention will be given herebelow with reference to FIGS. 1 though 6.

Figure 1:
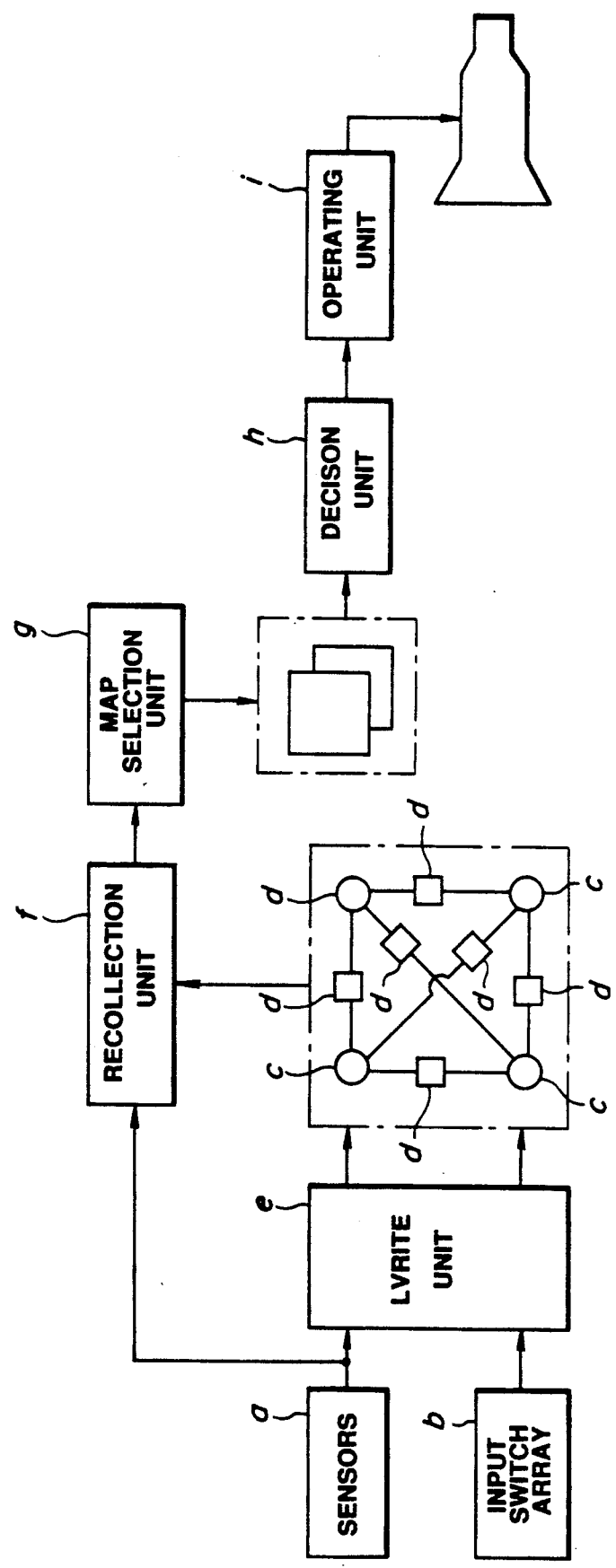
FIG. 1 is a schematic illustration showing the general idea of an automatic power transmission gear shifting control system according to the present invention.
Figure 2:
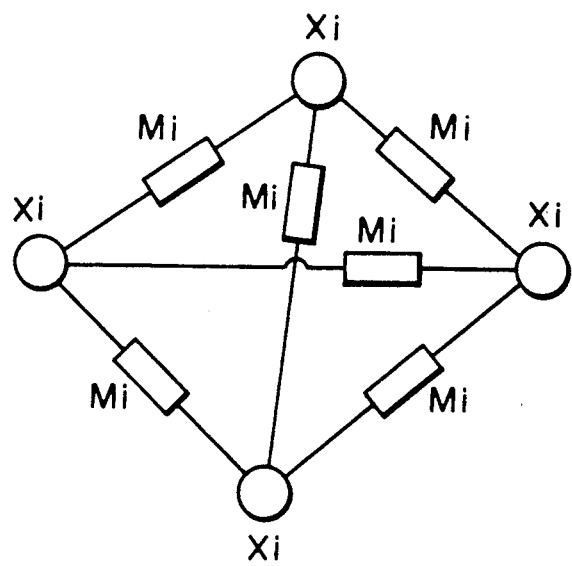
Figure 3:
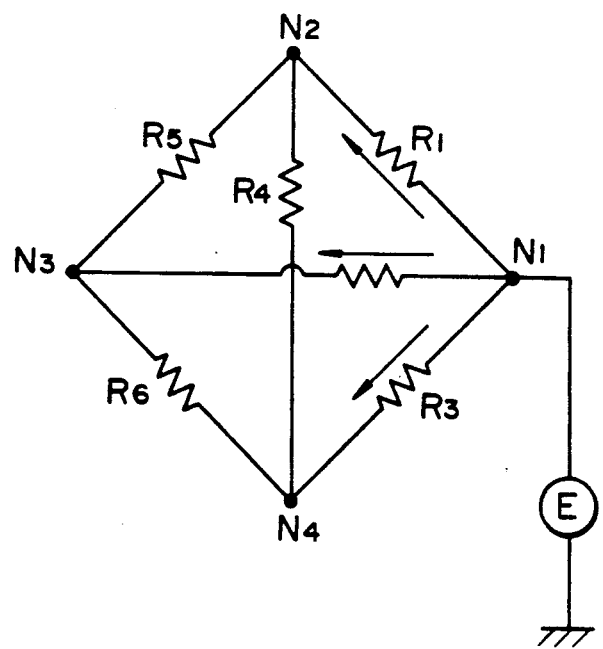

Referring to FIGS. 1 through 3, the automatic power transmission gear shifting control system according to the present invention has a plurality of sensors and detectors a which monitor various pre-selected vehicle driving parameters for providing vehicle driving condition indicative gear shifting control parameter data. The control system also has a manually operable input switch array b which is operable for manually inputting commands for transmission gear shifting operation by a driver. Sensors a and the input array b are connected to a write unit e. The write unit e is associated with an "ASSOCIATRON" unit. The logic of "ASSOCIATRON" has been proposed by Nakano of Tokyo University and is discussed in "Information System in Brain formed by Basic", published by Keigaku Shuppan K.K. on Mar. 30, 1988, pp. 17-29. The discussion concerning "ASSOCIATRON" is hereby incorporated by reference for the sake of disclosure.

The logic of "ASSOCIATRON" generally contains patterning of received information, writing of patterned information in an associative storage and recollecting information from the associative storage. "ASSOCIATRON" utilizes an associative storage model as shown in FIG. 2. The associative storage model contains a plurality of storage elements Xi (i=1, 2, 3 ...) arranged in a form of a storage array and associated with adjacent storage elements via information transfer elements Mi. In the logic of "ASSOCIATRON", each of the storage elements Xi is referred to as "neuron". Therefore, in the following disclosure, the word "neuron" is used for representing a storage element in an associative storage model in the "ASSOCIATRON" unit. Also, the information transfer elements Mi (i=1, 2, 3 ...) connecting the neurons Xi are referred to as "synapse" in the "ASSOCIATRON" unit. Therefore, in the following discussion, the word "synapse Mi" will be used for representing the information transfer elements. Each neuron Xi is variable of state amount 1, 0 and −1 for representing information stored therein. The information stored in each neuron Xi is transferred to the adjacent neurons Xi via the synapse Mi by preset transfer functions.

FIG. 3 shows an equivalent circuit corresponding to the structure of "ASSOCIATRON". In the equivalent circuit, nodes $N_1$ through $N_4$ corresponds the neurons Xi ($X_1$-$X_4$), and resistors $R_1$ through $R_4$ correspond to synapes Mi ($M_1$-$M_6$). In the example shown, the node $N_1$ is provided with a potential E. The potential E of the node $N_1$ is transferred to the adjacent nodes $N_2$, $N_3$ and $N_4$ via resistors $R_1$, $R_2$ and $R_3$ having transfer functions which correspond to resistance of the resistors. As a result a transfer of the potential E in the node $N_1$, a known potential pattern is formed by the combination of the potentials at the respective nodes $N_1$-$N_4$.

Figures 4, 6:
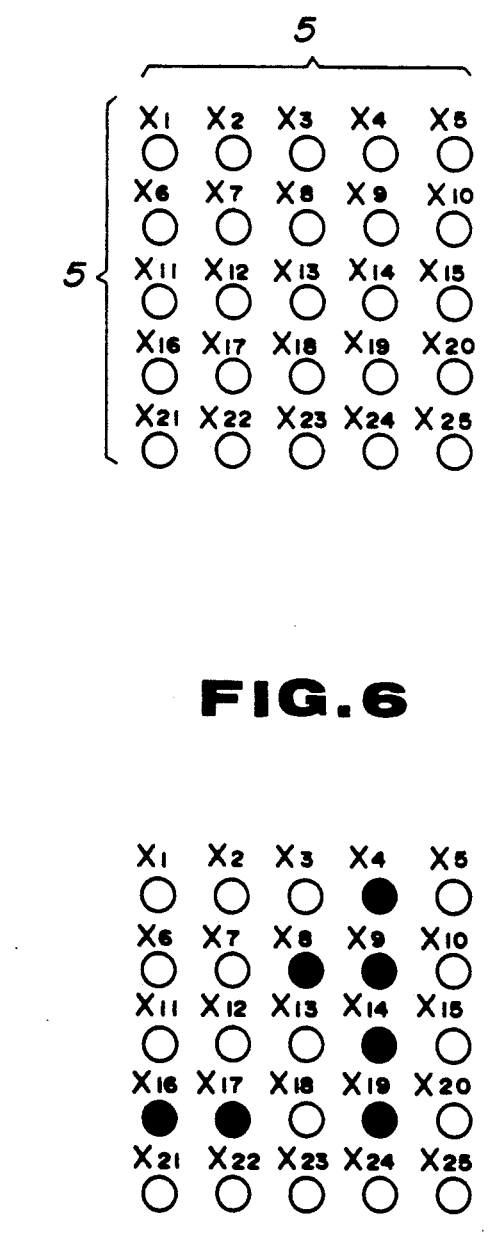
Figure 5A:
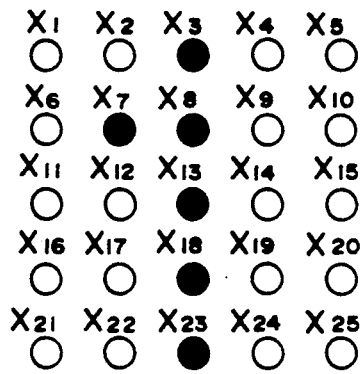
FIGS. 5(a), 5(b) and 5(c) show the matrix of "neurons" in the associative memory storing data.
Figure 5B:
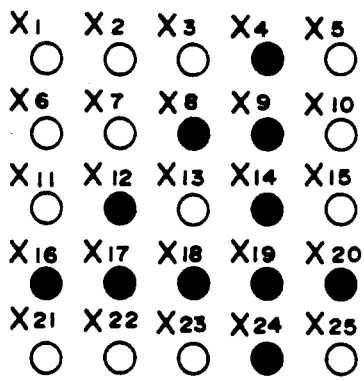
Figure 5C:
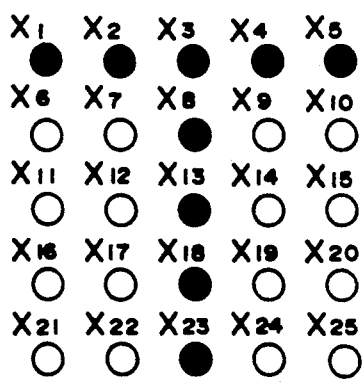

FIG. 4 shows a neuron matrix containing 5×5 neurons $X_1$ through $X_{25}$. By providing input for this neuron matrix, exciting patterns as shown in FIGS. 5(a), 5(b) and 5(c) are formed. In FIG. 5(a), the input information is a pattern of the figure one (1). In FIG. 5(b), the input information is a pattern of the figure four (4). In FIG. 5(c), the input information is a pattern of the character T. These patterns are stored in the associative storages for use in recollection in response to a recollecting input. For example, assuming that the recollection input as shown in FIG. 6 is provided, the recollection of a pattern 1 is made by association according to "ASSOCIATRON". In the recollecting procedure, the closest stored excitation pattern in the associative storage is selected and recollected. In the shown example, the recollection input contains excited neurons in $X_4$, $X_8$, $X_9$, $X_{14}$, $X_{16}$, $X_{17}$, $X_{19}$. The recollection input pattern is compared with the excitation patterns stored in the associative storage according to "ASSOCIATRON". As can be appreciated herefrom, the recollection input pattern of FIG. 6, is the closest to the excitation pattern of FIG. 5(b). As illustrated in FIG. 5(b), the stored pattern contains excited neurons $X_4$, $X_8$, $X_9$, $X_{12}$, $X_{14}$, $X_{16}$, $X_{17}$, $X_{18}$, $X_{19}$, $X_{20}$, $X_{24}$. Therefore, in the associative recollection according to "ASSOCIATRON", the neurons $X_{12}$, $X_{18}$, $X_{20}$ and $X_{24}$ are assumed as excited and thus the figure pattern of four (4) is recollected in response to the input of the recollection input pattern of FIG. 6.

By utilizing the strategy in "ASSOCIATRON" as set forth above, vehicular driving patterns are created and stored and subsequently recollected using the "ASSOCIATRON" logic for associative recollection, whereby automatic power transmission gear shifting patterns are adapted to the vehicular driving pattern selected.

Returning to FIG. 1, the write unit e forms write patterns which are representative of vehicle driving patterns on the basis of the information received from the sensors and detectors a, and the input switch array b. The write pattern formed by the write unit e is transferred to the "ASSOCIATRON" unit containing a plurality of neurons c and a plurality of synapse d which transfer information between the neurons. According to the write pattern, the relevant neurons c are excited to form an associative storage pattern representative of the particular vehicular driving pattern. The formed associative storage pattern is then stored in the associative storage in the "ASSOCIATRON" unit.

On the other hand, the transmission gear shifting control parameter data of the sensors and detectors a are also transferred to a recollection unit f which is associated with the "ASSOCIATRON" unit. The recollection unit f forms a recollecting pattern on the basis of the transmission gear shifting control pattern data. Then, the recollection unit f compares the formed recollecting pattern with the respective associative storage patterns which are stored in the associative storage of the "ASSOCIATRON" unit in order to select the associative storage pattern which is the closest in form to the recollecting pattern. The recollection unit f then transfers the recollection data which is representative of the selected associative storage pattern, to a map selection unit g. The map selection unit g is associated with one of the memory addresses in the associative storage for reading out the transmission gear shifting pattern according to the recollection data. A decision unit h utilizes the selected transmission gear shifting pattern and determines the automotive power transmission gear ratio according to the instantaneous transmission gear shifting control parameter data from the sensors and detectors. Based on the determined automatic power transmission gear ratio, an operating unit i becomes active for causing actual shifting of the gear ratio in the automatic power transmission j.

FIG. 7 shows the preferred construction of the automatic power transmission gear shift control system which is suitable for implementing the automatic power transmission gear selected utilizing the "ASSOCIATRON" unit as set forth above. In the illustrated embodiment, a steering angle sensor 2, an engine speed sensor 3, a throttle angle sensor 4, a vehicle speed sensor 5 and a vehicular cabin noise sensor 6 are employed as the sensors and detectors a. The steering angle sensor 2 is associated with a vehicular steering mechanism and designed for monitoring angular position of the vehicular steering in relation to a predetermined neutral steering position. The steering angle sensor 2 produces a steering angle signal St. The engine speed sensor 3 monitors a revolution speed of the engine to produce an engine speed indicative signal N. The engine speed sensor 3 may comprise a crank angle sensor which monitors revolution speed of a crankshaft of the engine. The throttle angle sensor 4 is designed for monitoring the throttle valve angular position which varies between a fully closed position to a fully open position. The throttle angle sensor 4 produces a throttle angle indicative signal θ. The vehicle speed sensor 5 monitors the vehicle traveling speed to produce a vehicle speed indicative signal V. The vehicular cabin noise sensor 6 monitors noise level. Here, the word "noise" is used to represent acoustic vibration which is generated in the vehicular cabin and which is variable in level depending upon vehicle driving conditions, such as for example, road noise, power noise, screaming noise. The vehicular cabin noise sensor 6 produces a noise level indicative signal Sd.

Reference numeral 7 represents a differentiation/integration circuit array for processing the input signals from the sensors. The differentiation/integration circuit array 7 comprises an integrator circuit 8 and differentiation circuits 9, 10, 11 and 12. The integrator circuit 8 and the differentiation circuit 9 are connected to the steering angle sensor 2 to respectively receive the steering angle indicative signal St. The integrator circuit 8 is designed to integrate the steering angle indicative signal St over a predetermined unit time for producing an integrated steering angle data St''. On the other hand, the differentiation circuit 9 is designed to differentiate the steering angle indicative signal St over the unit time for producing a steering speed data St'. Similarly, the differentiation circuit 10 receives the engine speed indicative signal N and differentiates the engine speed indicative signal over the unit time for producing an engine speed variation data N'. The differentiation circuit 11 receives the throttle angle indicative signal $\theta$ to differentiate the received signal over the unit time for deriving throttle angle variation rate $\theta'$. Also, the differentiation circuit 12 differentiates the vehicle speed indicative signal V over the unit time to derive a vehicle speed variation rate V'.

The steering angle sensor 2, the engine speed sensor 3, the throttle angle sensor 4, the vehicle speed sensor 5 and the vehicular cabin noise sensor 6 are directly connected to a multiplexing unit 15a of a control unit 15. The integrator 8 and the differentiation circuits 9, 10, 11 and 12 are also connected to the multiplexing unit 15a.

The control unit 15 also has an "ASSOCIATRON" unit 15b which may comprise a microprocessor including a CPU, a RAM, a ROM and so forth. The control unit 15 is further connected to a timer 13 which is designed to produce a periodic timing signal at predetermined intervals which corresponds to the predetermined unit time. A manually operable input switch array 14 which is adapted to be operated by the driver, is also connected to the control unit 15 for receiving the manually input command. For example, the input switch array 14 may comprise a two position switch provided in the vicinity of the driver's seat so that the driver may manually select the transmission gear shifting mode. In the shown embodiment, the input switch array 14 is adapted to produce commands CTI and CTII, for respectively selecting one of the preset transmission gear shifting modes for use in heavy traffic and in ordinary traffic.

The control unit 15 is programmed to implement "ASSOCIATRON" logic for writing vehicle driving patterns and associated transmission gear shifting patterns, and for associatively recollecting a pre-stored transmission gear shifting pattern according to the instantaneous vehicle driving pattern. Also, the control unit 15 stores transmission gear shifting pattern maps. Furthermore, RAM in the ASSOCIATRON unit 15b has an associative parameter array which comprises a plurality of memory cells, each serving as a neuron. The neurons are arranged in the form of a matrix. The parameter array is formed so as to store the driving condition indicative parameters with coupling coefficients M(I, J) for respective neurons X(I). Therefore, the parameters St, St', St'', N, N', $\theta$, $\theta'$, V, V' and Sd are stored in respectively relevant neurons X(I) as input via the multiplexing unit 15a. Simultaneously, the coupling coefficients M(I, J) are stored as driving condition pattern data in the parameter array as of the associative storage during the pattern writing operation. Each pattern stored in the parameter array is associated with one of a plurality of transmission gear shifting patterns. Namely, if the writing of the pattern is initiated in response to the signal, CTI for setting the transmission gear shifting mode for adaptation to the heavy traffic mode, the written pattern is used for selecting the transmission gear shifting pattern in heavy traffic. Similarly, if the write mode operation is triggered in response to the CTI command, the pattern is stored for associatively selecting the transmission gear shifting pattern in ordinary traffic.

On the other hand, in associative recollection, the "ASSOCIATRON" unit receives the parameter data via the multiplexing unit 15a. The "ASSOCIATRON" unit forms a recollection pattern according to the received parameters and thus associatively recollects the closest stored transmission gear shifting pattern in the parameter array. Then, the transmission gear shifting pattern is used for controlling the transmission gear shifting.

The "ASSOCIATRON" unit 15b thus outputs a transmission gear shifting command Ss to a shift control unit 16. The shift control unit 16 is responsive to the shifting command Ss from the "ASSOCIATRON" unit 15b, and; outputs a shift control signal Sv to an automatic power transmission 17 which causes operating shift valves to move into relevant valve positions for setting the transmission gear ratio at the selected gear position.

In the practical transmission gear ratio selection, the driver may wish to hold the transmission gear ratio at a second range (2 range) while the vehicle is in heavy traffic. Therefore, in the normal or ordinary automatic power transmission, the driver may shift the selector lever to the 2 range position for manually selecting the second gear ratio. In the prior proposed advanced system, the vehicle in heavy traffic is automatically detected on the basis of a preselected singular vehicle driving parameter, such as the throttle angle variation or variation of the longitudinal acceleration. As set forth, judgement of the vehicle driving condition relying on singular parameter can lead erroneous judgement for causing erroneous selection of the transmission gear shift pattern.

The shown embodiment of the transmission shift control system according to the present invention employs a plurality of vehicle driving condition indicative parameters for recollecting pre-stored vehicle driving patterns utilizing an "ASSOCIATRON". This is intended to match the automatically selected judgement of the vehicle driving condition to that manually made by the driver. The shown embodiment of the transmission gear shifting control system further employs a learning strategy for driving patterns in the parameter array, which enhances the accuracy in the recollection of the driving pattern.

Figure 8:
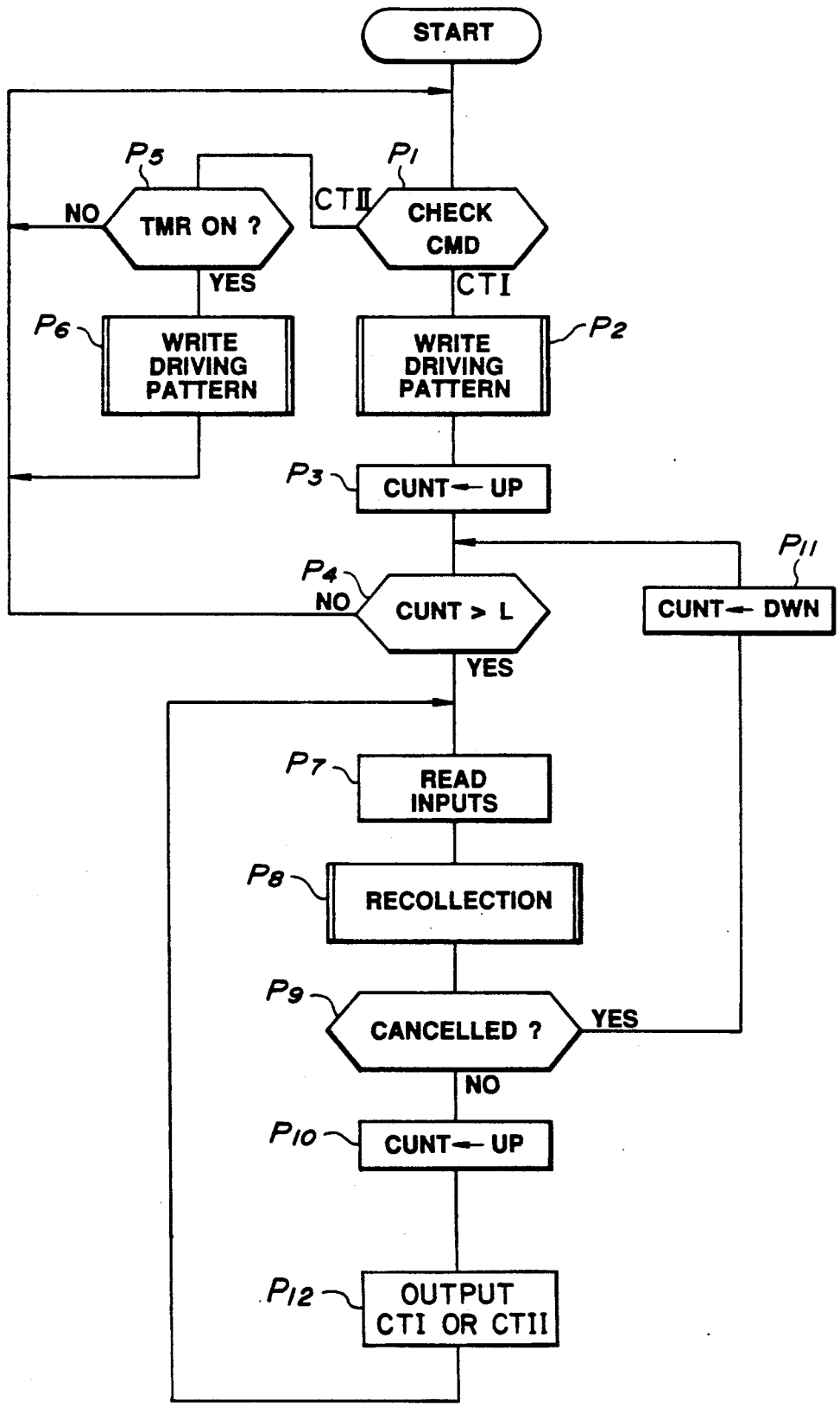
FIG. 8 is a flowchart showing operation of the preferred embodiment of the automatic power transmission gear shifting control system of FIG. 7.

FIG. 8 shows a flowchart showing the routine to be executed by the "ASSOCIATRON" unit 15b. The operation for writing driving patterns and recollecting the pre-stored driving pattern is performed according to the process illustrated in the flowchart of FIG. 8.

Immediately after starting execution, the input from the input switch array 14 is checked at a step P1. In practice, the check at step P1 is performed whether the manually input command CMD is CTI or CTII. When the input command CMD is the CTI command, the driver is manually selecting the transmission shifting pattern for heavy traffic. At the same time, the various driving condition indicative parameters represent the status of the corresponding vehicle driving parameters in heavy traffic. Namely, in the heavy traffic, the steering is maintained substantially at the neutral position. Therefore, the steering angle indicative signal St has to be maintained at a value substantially representative of the steering neutral position. Also, since the steering angular displacement is substantially small, the steering speed indicative value St' and the integrated value St" are held smaller. Furthermore, the engine speed indicative signal value N is maintained smaller to represent a low or intermediate vehicle speed range. Also, variation of the throttle angle indicative signal $\theta$ has to be maintained at small value. In addition, because the engine is running at relatively low speed, and the vehicle is also running at low speed, the noise level within the vehicular cabin has to be at a low level.

Since the driver positively and manually enters the CTI command based on his judgement that the traffic condition is a heavy traffic condition, respective parameter data St, St', St", N, N', $\theta$, $\theta'$, V, V' and Sd can be written as pattern data for the heavy traffic condition representative pattern in the "ASSOCIATRON" unit 15b, at step P2.

Figure 9:
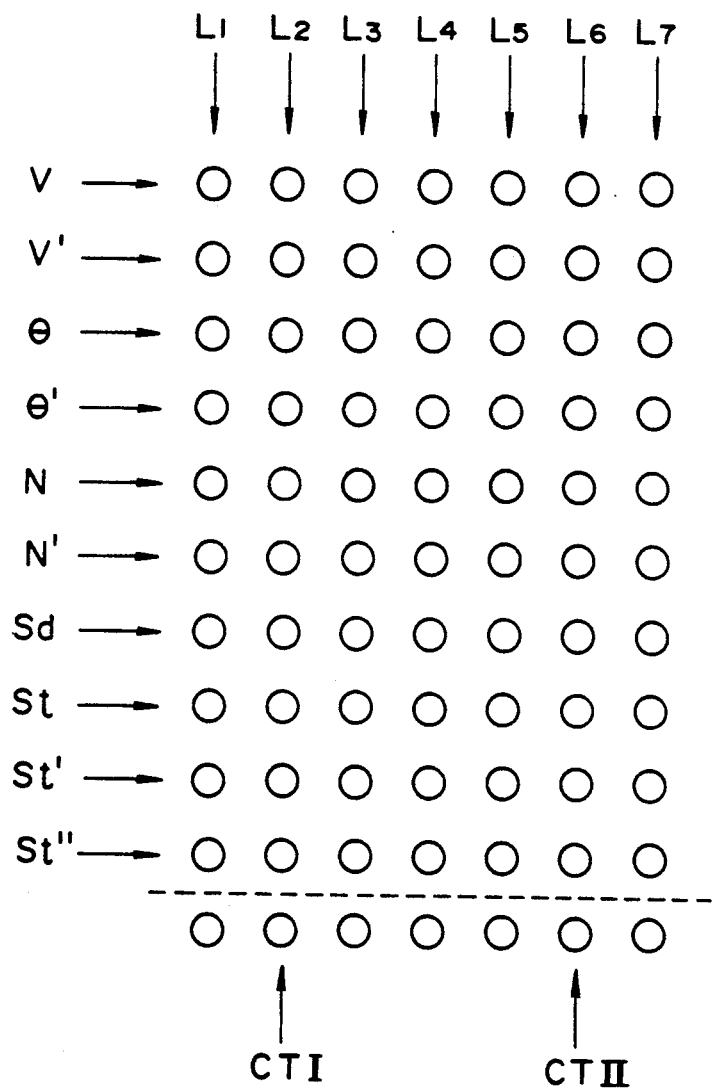
FIG. 9 is a chart showing a matrix of "neurons" in application of "ASSOCIATRON" for the automatic power transmission gear shifting control.
Figure 10:
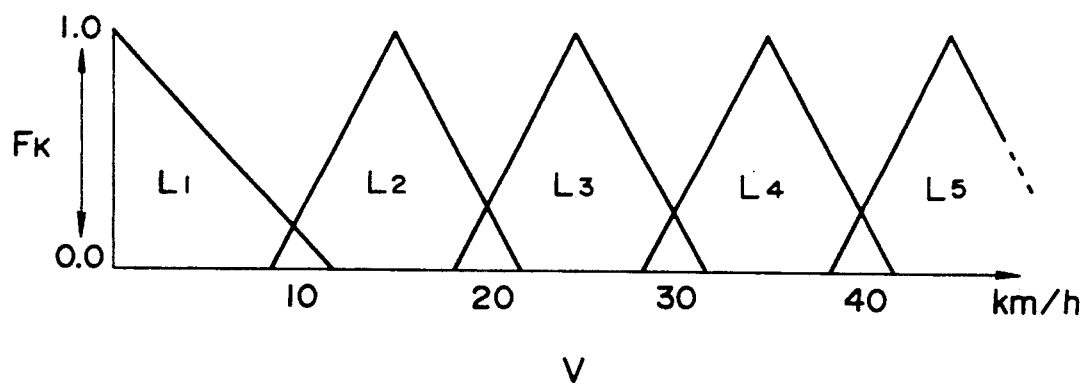
FIG. 10 is an explanatory illustration showing the membership function employed in "ASSOCIATRON"

As shown in FIG. 9, in the illustrated embodiment, the "ASSOCIATRON" unit 15b has matrix of 7×11 neurons. Each row of the neuron matrix is provided for each parameter. Each column of the neuron matrix is provided for representing a range of values for each parameter. The range of each parameter is set as a "membership function". An example of the membership function for the vehicle speed V is shown in FIG. 10. As can be seen from FIG. 10, the membership function is determined as a function of the value of the parameter as indicated in abcissas utilizing a membership value Fk in ordinates.

By utilizing the membership function, required memory storage capacity for each parameter can be significantly reduced and data processing speed becomes higher. In the illustrated example of FIG. 10, the membership functions are set at L1, L2, L3, L4, L5, L6 and L7 as shown according to the vehicle speed V. In general, these membership functions as employed are classified as "very small" "small" "slightly small", "ordinal", "slightly large", "large" and "very large" . . .

The neuron matrix has a row specifically provided for the manually entered command CMD through the input switch array 14. One of the neurons in this specific row is provided for the CTI command. Another neuron in this row is provided for the CTII command. In FIG. 9, the specific row is provided as the lowermost row. The neuron for storing the CTI command stores specific transmission gear shifting pattern data. For example, the data stored in the CTI command storing neuron will be a data representative of a command for 2 range hold mode (2 HLD). The "ASSOCIATRON" unit 15b also has a matrix for the coupling coefficients M(I, J) which is representative of the coupling strength of respective neurons. This coupling coefficient M(I, J) is provided for respective transmission gear shifting modes. Every time the CTI command is input, the corresponding pattern data in the neuron matrix and coupling coefficient M(I, J) matrix for respective neurons are updated.

After updating the pattern data at the step P2, a pattern writing counter CUNT is counted up by one (1) at a step P3. The pattern writing counter value CUNT is compared with a predetermined updation criterion L at a step P4. The updation criterion L is set at a value which is representative of the numbers of occurrences of updation of the pattern data and the coupling coefficient. The number of updation for setting the updation criterion L may be predetermined to provide sufficiently high reliability of the pattern data and coupling coefficients for respective neurons to ensure accurate recollection of the vehicular driving condition which is closest act to the actual driving condition. Namely, the updation is repeated until the coupling coefficients being accumulated are at a sufficiently large value. Therefore, until the pattern writing counter value CUNT reaches the updation criterion L, operation for recollection of the vehicle driving pattern is inhibited. Therefore, when the pattern writing counter value CUNT is smaller than the updation criterion L, the process of steps P1 through P4 is repeated until the writing counter value CUNT becomes greater than the criterion L.

On the other hand, when the judgement at step P1 is that the entered command is the CTII command, the driver does not judge that the current traffic is heavy enough to require the heavy traffic mode transmission gear pattern. Therefore, a judgement can be made that the traffic condition is ordinary. At this time, the process goes to step P5. At the step P5, periodic clock TMR from the timer 13 is checked. When the level of the periodic clock TMR is LOW, the process returns to step P1 to wait for the HIGH level of the periodic clock TMR. When the HIGH level of the periodic clock is detected at step P5, updation of the pattern data in ordinary traffic is performed at step P6.

Here, it should be noted that updation of the pattern data for ordinary traffic is performed with respect to the parameter data set forth above and the coupling coefficients of neurons as well. During the process of updation of the pattern data and the coupling coefficient, the transmission shifting pattern representative data which is indicative of the normal shifting pattern will also be stored in the specific neuron as CTII command data.

The implementation of writing driving patterns for the "ASSOCIATRON" unit will be discussed hereinbelow. The number of memory cells which serves as neurons is n, and each neuron is respectively assigned address or neuron numbers such as $C_1, C_2 \ldots C_n$. Further, the state of the cell $C_i (i=1, 2 \ldots n)$ is $X_i$, the coupling coefficient M(i, J) with respect to the cell $C_i$ and cell $C_j$ which is located adjacent the cell $C_i$ can be represented by $M_{ij}$. When the cell $C_i$ has no data, the coupling coefficient $M_{ij}$ becomes zero (0). When a certain driving pattern is input, the status of respective cells becomes $X_1, X_2 \ldots X_n$. The $X_i$ is variable between 1 and $-1$. The coupling coefficient $M_{ij}$ is increased by one (1) when the polarity of the states of the adjacent cells are equal and otherwise reduced by one (1). This can be illustrated by the following formula which is derived by slightly modifying Hepp's synapse strengthen formula:

$$M_{ij} = M_{ij} + X_i X_j.$$

The foregoing formula represents that when the adjacent neurons are both excited simultaneously, the synapse therebetween is strengthened. This theory is well known in the neuron computer field. Therefore, by repeating entry of the same or similar driving patterns, the coupling coefficient is strengthened or becomes greater in value. Therefore, by repeating entry of driving pattern data over a predetermined number of times, the synapse becomes sufficiently strengthened and is thus reliable.

When the pattern writing counter value CUNT becomes greater than the predetermined updation criterion L as checked at the step P4, the recollection process is enabled.

In the recollection process, the parameter data St, St', St", N, N', θ, θ', V, V' and Sd are monitored and read out at a step P7. These pattern data are treated as recollection data. Recollection is then performed at a step P8. Assuming the recollection data is X, the recollection output $y$ (=$y_1, y_2 \ldots y_n$) can be illustrated by:

$$y_i = \phi (M_{i1} \times X_1 + M_{i2} \times X_2 \ldots M_{ij} \times X_j \ldots M_{in} \times X_n)$$

where $\phi(Z)$ is equivalent to SGN coefficient of BASIC language and is variable between 1 (when Z is positive), 0 (when Z is zero) and −1 (when Z is negative).

As will be appreciated herefrom, the coupling coefficient represents coupling status of respective cells to other cells. The ASSOCIATRON unit 15b thus associatively recollects the pre-stored pattern in response to the recollection input and the stored coupling coefficients. Thus, the driving pattern can be recollected even when a part of recollection data is lacking.

Figure 11:
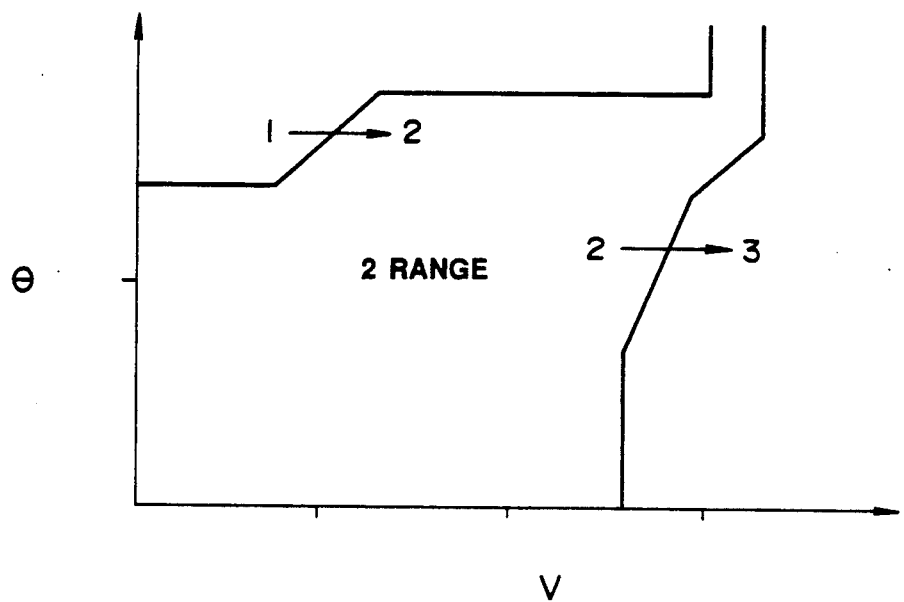
FIG. 11 is a chart showing a gear shifting pattern map to be used in a heavy traffic state.

Namely, when the command data, i.e. CTI or CTII command data is lacking and the recollection data represents a heavy traffic condition, the CTI command data can be associatively recollected and filled by making a judgement that the current traffic condition is heavy as recorded. Then, the 2 range holding command 2 HLD can be selected as when the 2 HLD command is set as the CTI command in the lowermost row of the neuron matrix. In response to this, the transmission gear shifting pattern for 2 range holding as illustrated in FIG. 11 is selected.

Figure 12:
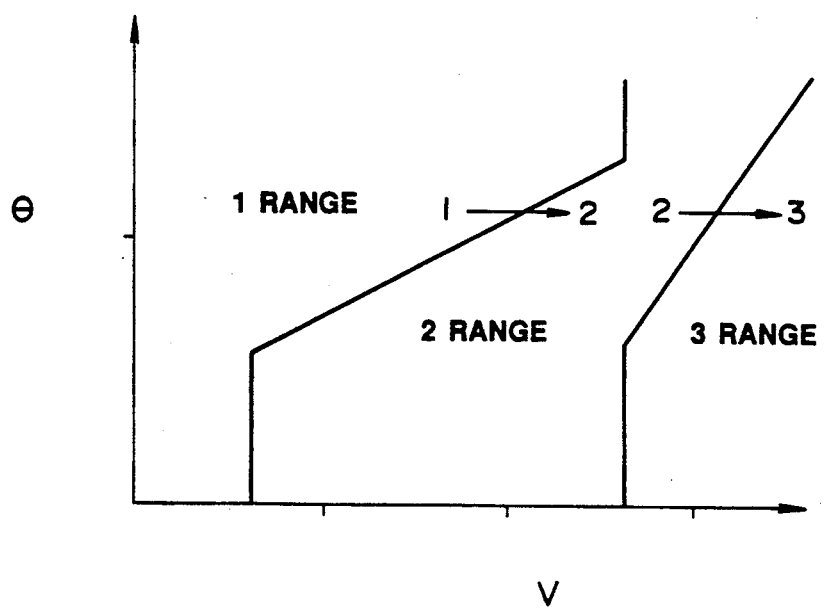
FIG. 12 is a chart showing a gear shifting pattern map to be used in an ordinary traffic state.

In the illustrated embodiment, the 2 range is set at a wider range in comparison with that in the normal transmission shifting pattern as illustrated in FIG. 12. Therefore, in heavy traffic, the shifting of the transmission gear ratio to a higher gear ratio, i.e. 3 range or 4 range is prevented.

Furthermore, when a certain pattern data in the recollection data is lacking in addition to lacking the transmission gear shifting pattern indicative command, the data which is missing can be supplemented by the recollected closest driving pattern which is stored in the neuron matrix. Therefore, even when one or two pattern data are lacking, it is still possible to associatively recollect the driving pattern which most accurately corresponds to the current driving condition.

In the illustrated embodiment, an optional strategy for erroneous judgement of the driving condition is provided. Namely, after selecting the transmission gear shifting pattern according to the entered recollection data, the driver may cancel the selected transmission gear shifting pattern which was selected due to error in judging the traffic condition or in selecting the transmission gear position. In order to check occurrence of cancellation, a step P9 is provided. When cancellation of the selected transmission gear shifting pattern is detected at step P9, the pattern writing counter value CUNT is decremented by a predetermined value which is much greater than one (1) at a step P11, and the process returns to the step P4. Therefore, frequent occurrence of cancellation of the selected transmission gear shifting pattern makes the pattern writing counter CUNT smaller than the predetermined updation criterion L. If this is the case, the answer at the step P4 becomes negative and starts the pattern updation loop of steps P1 to P6.

On the other hand, when the cancellation of the selected transmission gear shifting pattern is not detected as checked at step P9, the pattern writing counter value CUNT is incremented by one (1) at a step P10. Therefore, by repeating the step P10, the pattern writing counter value CUNT is increased to show a higher reliability. After step P10 the routine proceeds to step P12 wherein the CTI or CTII commands are provided based on the driving pattern recollected in step P8.

As will be appreciated, the present invention fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the illustrated embodiments which can be embodied without departing from the principle of the invention set out in the appended claims.

What is claimed is:

1. A control system for controlling transmission gear shifting for an automatic transmission of an automotive vehicle, said control system comprising:

first means for monitoring a plurality of vehicle driving parameters to provide signals indicative of parameter data representing types and values of monitored vehicle driving parameters;

second means for shifting a gear ratio of said automatic transmission in one of first and second gear shift modes according to first and second shift schedule maps respectively;

third means for manually switching between said first and second gear shift modes;

fourth means, including a matrix provided with a plurality of memory addresses which are variable from first to second address values in response to input of said parameter data, said fourth means being responsive to signals from said first and third means for storing parameter data in corresponding addresses according to types and values of parameter data to provide a data pattern which represents one of said first and second gear shift modes and for determining relations between first and second address values of adjacent addresses which include variables to which a preselected value is added when address values between adjacent addresses are the same and from which said preselected value is subtracted when address values between adjacent addresses are different from each other;

fifth means responsive to signals from said first means indicative of vehicle driving parameters to input parameter data thereof to corresponding addresses for modifying each address value based on magnitudes of variables between adjacent addresses determined by said fourth means to provide a data pattern corresponding to a data pattern stored in addresses provided by said fourth means to determine a corresponding one of said first and second gear shift modes and for providing a signal indicative thereof; and sixth means associated with said second means for changing between said first and second shift modes based on said signal from said fifth means.

2. A control system as set forth in claim 1, wherein said fifth means is responsive to a positive value of a variable representing a relation relative to an adjacent address to change an address value to the same value as stored in said adjacent address and responsive to a negative value to change said address value to a value different from said adjacent address.

3. A control system as set forth in claim 1, wherein said first means monitors a steering angular position, a throttle valve angular position, a vehicle speed, and an engine revolution speed and provides parameter data representative thereof.

4. A control system as set forth in claim 2, wherein said fourth means stores parameter data at preselected times to provide a plurality of data patterns, said fifth means modifying address values of parameter data of currently monitored vehicle driving parameters based on corresponding relations determined by said fourth means to provide a data pattern corresponding to one of the data patterns provided by said fourth means.

5. A control system as set forth in claim 3, wherein said first means further monitors a noise level in a vehicular cabin and provides parameter data indicative thereof.

6. A control system as set forth in claim 4, further comprising seventh means for selectively disenabling operation of said fifth means and for effecting operation of said fourth means repeatedly.

7. A control system for controlling transmission gear shifting for an automatic transmission of an automotive vehicle, said control system comprising:
first means for monitoring a plurality of vehicle driving parameters to provide signals indicative of parameter data representing types and values of monitored vehicle driving parameters;

second means for shifting a gear ratio of said automatic transmission in one of first and second gear shift modes according to first and second shift schedule maps respectively;

third means for manually switching between said first and second gear shift modes;

fourth means including an associatron system which is responsive to signals from said first means for storing a preselected number of data patterns in memory addresses which are defined by types and values of parameter data, said associatron system being responsive to a signal from said first means after storing said preselected number of data patterns to provide a data pattern stored in memory addresses which is the most similar to a data pattern defined by parameter data currently provided by said first means to determine a corresponding one of said first and second gear shift modes and for providing a signal indicative thereof; and fifth means associated with said second means for changing between said first and second shift modes based on said signal from said fourth means.

8. A control system as set forth in claim 7, further comprising sixth means for selectively disenabling operation to provide a data pattern in memory addresses which is the most similar to a data pattern defined by parameter data currently provided by said first means and for effecting operation to store said data pattern in said memory addresses repeatedly.

9. A control system as set forth in claim 7, wherein said first means monitors a steering angular position, a throttle valve angular position, a vehicle speed, and an engine revolution speed and provides parameter data representative thereof.

10. A control system as set forth in claim 7, wherein said first means further monitors a noise level in a vehicular cabin and provides parameter data indicative thereof.

* * * * *